UNITED STATES PATENT OFFICE.

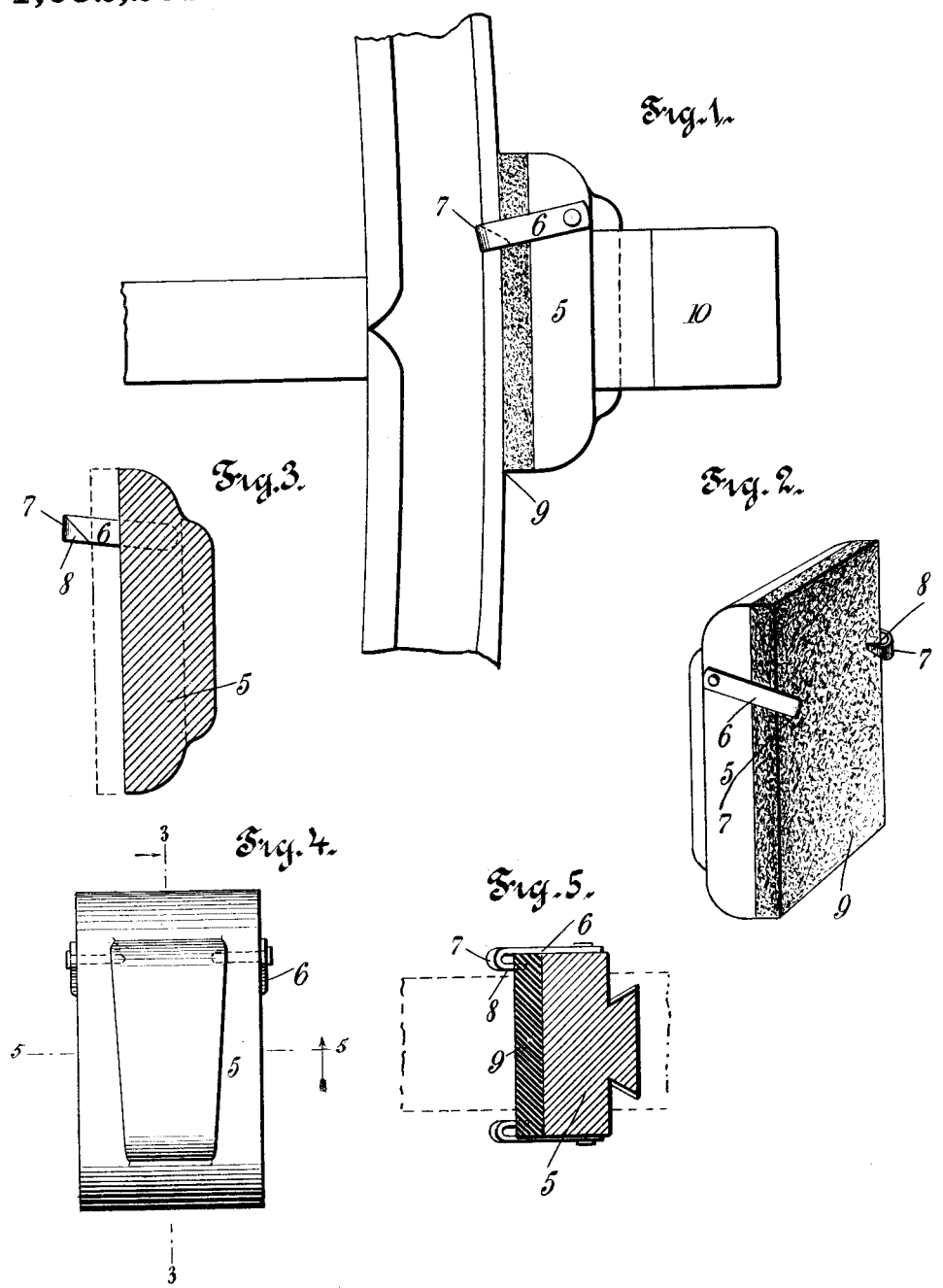

KARL DEAVENPORT SAULPAW, OF CALHOUN, TENNESSEE.

ATTACHMENT FOR BRAKES.

1,052,281. Specification of Letters Patent. Patented Feb. 4, 1913.

Application filed November 22, 1911. Serial No. 661,672.

*To all whom it may concern:*

Be it known that I, KARL D. SAULPAW, a citizen of the United States, and a resident of Calhoun, in the county of McMinn and State of Tennessee, have invented a new and Improved Attachment for Brakes, of which the following is a full, clear, and exact description.

My invention relates to attachments for brakes, and it has for its object to provide a brake block with two pivoted arms having teeth for engaging and holding the brake shoe in position.

Additional objects of the invention will appear in the following complete specification, in which the preferred form of the invention is disclosed.

In the drawings similar characters of reference indicate corresponding parts in all the views, in which—

Figure 1 is a fragmentary view of a wheel having a tire inclosed by a brake shoe supported by my improvement; Fig. 2 is a view of the brake block with my brake shoe; Fig. 3 is a sectional view on the line 3—3 of Fig. 4; Fig. 4 is an end view of the brake block; and Fig. 5 is a sectional view on the line 5—5 of Fig. 4.

By referring to the drawings it will be seen that a brake block 5 is provided, with two arms 6, these arms 6 being pivoted one at each side to the brake block 5. The arms 6 have their terminals 7 bent in the direction of each other and inwardly, the terminals being cut to form teeth 8. The brake shoe 9 is disposed between the arms 6 and against the brake block 5, the teeth 8 engaging the brake shoe 9 to hold it in position.

A new brake shoe 9 may be substituted for a worn or damaged brake shoe by raising the arms 6 when the worn brake shoe may be readily disengaged from the teeth 8 to permit of its removal. After a new brake shoe has been inserted it may be tapped at the top with a hammer so that the sides of the wearing face of the brake shoe will be forced against the teeth 8 thereby embedding the teeth to hold the brake shoe in adjusted position. It is unnecessary to remove the brake block 5 in order to substitute a new brake shoe 9 for one which has been damaged, and as it is unnecessary to use nails or other such means to secure the brake shoe to the brake block, the brake block will last indefinitely, while the brake shoe may be readily replaced from time to time, as required.

Having thus described my invention I claim as new, and desire to secure by Letters Patent:

An attachment for brakes having a brake block and two arms pivoted one at each side of the brake block, with free terminals which are bent in the direction of each other, and then inwardly, the upper surfaces of the inwardly extending terminals being cut away inwardly and downwardly substantially to the lower surfaces of the said terminals, so that when the arms are raised a brake shoe may be disposed between the cut surfaces of the terminals of the arms and the brake block to permit the removal of the brake shoe, and when the arms are lowered, the teeth will engage the brake shoe to hold the brake shoe in place against the brake block.

In testimony whereof I have signed my name to this specification in the presence of two subscribing witnesses.

KARL DEAVENPORT SAULPAW.

Witnesses:
J. P. EARUS,
B. H. CARMICHAEL.

Copies of this patent may be obtained for five cents each, by addressing the "Commissioner of Patents, Washington, D. C."